(12) United States Patent
Coing

(10) Patent No.: US 11,021,051 B2
(45) Date of Patent: Jun. 1, 2021

(54) LIQUID VEHICLE TANK COMPRISING A FASTENED COMPONENT

(71) Applicant: Plastic Omnium Advanced Innovation and Research, Brussels (BE)

(72) Inventor: Jean-Francois Coing, Clairoix (FR)

(73) Assignee: Plastic Omnium Advanced Innovation and Research, Brussels (BE)

( * ) Notice: Subject to any disclaimer, the term of this patent is extended or adjusted under 35 U.S.C. 154(b) by 0 days.

(21) Appl. No.: 15/748,007

(22) PCT Filed: Jul. 29, 2016

(86) PCT No.: PCT/EP2016/068216
§ 371 (c)(1),
(2) Date: Jan. 26, 2018

(87) PCT Pub. No.: WO2017/021327
PCT Pub. Date: Feb. 9, 2017

(65) Prior Publication Data
US 2018/0215252 A1    Aug. 2, 2018

(30) Foreign Application Priority Data
Jul. 31, 2015    (EP) ..................... 15306255

(51) Int. Cl.
*B60K 15/03*    (2006.01)
*B29C 65/00*    (2006.01)
(Continued)

(52) U.S. Cl.
CPC ........ *B60K 15/03177* (2013.01); *B29C 49/20* (2013.01); *B29C 49/4268* (2013.01);
(Continued)

(58) Field of Classification Search
CPC .............. B60K 15/03177; B29C 49/20; B29C 49/4268; B29C 65/002; B29C 66/53247;
(Continued)

(56) References Cited

U.S. PATENT DOCUMENTS 4,700,868 A    10/1987    Dirkin
6,305,568 B1 *  10/2001    Suzuki ............. B60K 15/03177
                                                                220/562
(Continued)

FOREIGN PATENT DOCUMENTS

DE         100 50 384 A1    4/2001
DE    10 2012 009 157 A1   11/2013
(Continued)

OTHER PUBLICATIONS

International Search Report dated Jan. 16, 2017, in PCT/EP2016/068216 filed Jul. 29, 2016.

*Primary Examiner* — J. Gregory Pickett
*Assistant Examiner* — Niki M Eloshway
(74) *Attorney, Agent, or Firm* — Oblon, McClelland, Maier & Neustadt, L.L.P.

(57) ABSTRACT

A liquid vehicle tank (1) having a wall made of a plastic material, the tank (1) comprising a component (3, 5) affixed to the wall, the component (3, 5) having a portion (10) embedded in the wall, the embedded portion (10) having an external surface (21) a part of which is chemically incompatible with the plastic material of the wall, wherein the tank (1) also comprises a strengthening element welded to the wall over the embedded portion (10) of the component (3, 5).

14 Claims, 3 Drawing Sheets

(51) Int. Cl.
*B29C 49/20* (2006.01)
*B29C 49/42* (2006.01)
*B29L 31/00* (2006.01)
*B29C 65/02* (2006.01)
*B29K 101/12* (2006.01)

(52) U.S. Cl.
CPC ...... *B29C 65/002* (2013.01); *B29C 66/53247* (2013.01); *B29C 66/71* (2013.01); *B29C 66/72343* (2013.01); *B29C 66/7392* (2013.01); *B29C 65/028* (2013.01); *B29C 66/12464* (2013.01); *B29C 66/7234* (2013.01); *B29C 2049/2034* (2013.01); *B29C 2049/2047* (2013.01); *B29K 2101/12* (2013.01); *B29L 2031/7172* (2013.01); *B60K 2015/03039* (2013.01); *B60K 2015/0346* (2013.01); *B60K 2015/03046* (2013.01); *B60K 2015/03447* (2013.01); *B60K 2015/03467* (2013.01); *B60K 2015/03493* (2013.01)

(58) Field of Classification Search
CPC .............. B29C 66/71; B29C 66/72343; B29C 66/7392
USPC .................................................. 220/562, 644
See application file for complete search history.

(56) References Cited

U.S. PATENT DOCUMENTS

| | | | |
|---|---|---|---|
| 6,415,941 B1 * | 7/2002 | Huse | ........ B29C 41/04 220/4.13 |
| 6,840,264 B1 | 1/2005 | Bhavsar et al. | |
| 7,955,672 B2 * | 6/2011 | Kanazawa | ........ B29C 63/0082 428/34.1 |
| 2004/0124567 A1 | 7/2004 | Stangier | |
| 2005/0055830 A1 | 3/2005 | Bergsma et al. | |
| 2006/0260129 A1 | 11/2006 | Bergsma et al. | |
| 2011/0220644 A1 * | 9/2011 | Yager | ................ B60K 15/04 220/86.1 |
| 2013/0206775 A1 * | 8/2013 | Heidemeyer | ........ B60K 13/04 220/562 |
| 2014/0217094 A1 * | 8/2014 | Wolf | ................ B60K 15/03177 220/86.2 |
| 2014/0224345 A1 * | 8/2014 | Bostwick, IV | ........... F17C 3/00 137/15.01 |
| 2015/0239198 A1 * | 8/2015 | Iwata | ................ F16L 23/12 138/109 |
| 2015/0306807 A1 * | 10/2015 | Borchert | ................ B29C 49/58 156/245 |
| 2015/0336322 A1 * | 11/2015 | Coing | ................ B29C 49/4815 264/516 |
| 2016/0075074 A1 * | 3/2016 | Dukaj | ................ B29C 47/0054 264/516 |
| 2016/0160753 A1 * | 6/2016 | Boutot | ................ F02B 63/048 220/23.83 |
| 2017/0028840 A1 * | 2/2017 | Coing | ................ B60K 15/03 |

FOREIGN PATENT DOCUMENTS

| EP | 0 239 407 A2 | 9/1987 |
|---|---|---|
| EP | 1 514 718 A2 | 3/2005 |

* cited by examiner

LIQUID VEHICLE TANK COMPRISING A FASTENED COMPONENT

The present invention relates to a liquid vehicle tank comprising a wall made of plastic, the tank comprising a component affixed to its wall.

The term "liquid tank" is intended to denote a sealed tank able to store liquid under diverse and varying environmental and usage conditions. Examples of liquid tank are a fuel tank fitted to motor vehicles, a urea and/or an ammonia tank for SCR systems of motor vehicles.

A liquid tank comprises generally components attached to the internal face of the tank wall and/or to the external face of the tank wall. Some components can comprise a portion or a surface made of a material different from that of the tank. Secure fixation of such components to the tank wall cannot be achieved by welding. Generally, such components are fixed to the tank by using component coating or riveting technique known in the art.

The risk is hardly bearable in the automotive industry where strict requirements concern the safety of the vehicle and the passengers under various conditions.

It is therefore an object of the invention to provide a liquid vehicle tank made of plastic with a strengthened fastening link between a wall of the tank and a component having an embedded part, i.e. a part embedded in the tank wall, a portion of which cannot be welded to the tank wall.

The term "embedded part" should be understood as a part which is buried in a bloc of solid material which traps the part, so that said part cannot be withdrawn from the bloc without opening the bloc surrounding the buried part. Accordingly, the part of the component embedded in the tank wall cannot be withdrawn from the tank wall without opening the tank wall.

The invention relates to a liquid vehicle tank having a wall made of a plastic material, the tank comprising a component having a portion embedded in the tank wall, wherein the tank comprises at least one strengthening element welded to the tank wall to withstand the stress of the plastic material of the tank wall in a region surrounding the embedded portion of the component.

By using the strengthening element of the present invention, the component is securely fixed to the tank wall. Indeed, the strengthening element of the present invention prevents deformation of the welding region. In other words, the strengthening element prevents the opening of plastic material wrapping the embedded portion of the component. Thus, the strengthening element prevents the release of the embedded portion of the component out of the tank wall.

In a particular embodiment, the strengthening element has a ring shape.

In a particular embodiment, the embedded portion has an external surface a part of which is chemically incompatible with the plastic material of the wall, and the strengthening element is welded to the wall over the embedded portion of the component.

According to one aspect of the invention, at least a part of the element is arranged between the embedded portion of the component and the exterior surface of the wall which is closest to the component. For example, if the component is fastened within the tank, the element is welded between the embedded portion of the component and the interior volume delimited by the tank wall. If the component is fastened to the outside of the tank, the element is welded between the embedded portion and the exterior of the tank. Without the strengthening element, the component is only clamped in the tank wall, but the clamping part of the tank wall may open and release the component. Therefore, the element is an impediment to the unfastening of the component and thus strengthens the link between the component and the tank wall. Because the strengthening element is welded to the tank wall, it is continuously merged with the plastic material of the tank wall and cannot separate therefrom. Preferably, the insert is made of a material harder than the material of the wall in order to strengthen the zone around the fastening area. Preferably, the component is affixed to the wall by overmolding.

In an embodiment of the invention, the wall has an opening and the component is affixed to the wall around the opening. The component has a hollow part which is connected to the interior of the tank. The component is preferably impermeable to the liquid inside the tank. The insert is whether positioned between the opening and the embedded portion or surrounds the embedded portion.

In another embodiment of the invention, the external surface of the embedded portion of the component has a second part which is chemically compatible with the plastic material of the wall and which is welded to the wall of the tank. In this case, the fastening of the component is more resistant than a single overmolding, but the presence of the element improves even more its resistance to reach a higher standard of safety.

Advantageously, the strengthening element is welded to the second part of the component. The element forms a reinforcing bridge between the embedded portion of the component and the tank wall. Since the element is welded to both of them, the link between the component and the tank wall is reinforced significantly. The strengthening effect grows with the size of the second part.

In an embodiment of the invention, the part of the external surface of the component which is chemically incompatible with the plastic material of the wall is made of a liquid impermeable layer. Preferably, the tank is a fuel tank. Since imperviousness and security standards concerning onboard fuel tanks are higher than other kinds of tanks, a strong fastening between the component and the tank is more required.

Advantageously, the wall of the tank comprises a liquid impermeable layer, especially a fuel impermeable layer, usually called "liquid impermeable barrier of the wall".

In an embodiment of the invention, the embedded portion of the component comprises an internal surface which follows the shape of the liquid impermeable barrier of the wall.

Advantageously, the maximal distance between the internal surface of the embedded portion of the component and the liquid impermeable barrier of the wall is inferior to 200 µm, preferably inferior to 100 µm, more preferably inferior to 40 µm. The space between the internal surface of the embedded portion and the liquid impermeable barrier represents the liquid leak path also called the liquid permeation path. In order to reduce the leak speed by reducing the width of the permeation path, the embedded portion should approach as close as possible the liquid impermeable barrier without touching it. The distance between the portion and the barrier is controlled during the molding of the portion on the tank wall.

In an embodiment of the invention, the internal surface of the embedded portion of the component comprises a projection. Since the internal surface of the embedded portion follows the shape of the liquid impermeable barrier, the projection lengthens the liquid permeation path which reduces the leak speed of the liquid. The length of the permeation path increases with the height of the projection.

The component is preferably an element selected in the following list: a nipple, an inlet check valve, a fill spud, an electrical connector, a housing, a level sensor support, a pump support, a heating support, a clip, a cam lock, a module, a fuel delivery module, etc.

The present invention also relates to a method for fastening a component to a wall of a tank, comprising the following steps:
- overmolding a portion of the component on a parison during blow molding of the parison so that the portion is at least partially embedded in the parison,
- cooling the parison to obtain a rigid wall,
- welding a strengthening element to the wall over the portion of the component embedded in the wall.

Thanks to the welding of the strengthening element between the embedded portion and the external surface of the wall which is closest to the component, the method achieves a stronger fastening between the component and the wall. This embodiment is particularly advantageous when the overmolded portion is partly made of material chemically incompatible with the material of the tank. The portion of the component is overmolded either inside the parison or outside. In a particular embodiment, the tank can be a tank for the storage of a liquid or a solution. In another particular embodiment, the tank can be a tank for the storage of a gas or a gas mixture.

According to an embodiment of the invention, an opening is drilled in the rigid wall through the portion of the component embedded in the parison.

Alternatively, an opening is obtained by piercing the parison during blow molding of the parison at the time the portion of the component is overmolded around the opening. Then, the insert is welded over the portion of the component which is embedded in the wall.

In an embodiment of the invention, the strengthening element is welded to the component at the time the strengthening element is welded to the wall. This implies that the overmolded portion of the component has a part made of a chemically compatible material with the wall. The quality of the fastening obtained with the method of the invention increases with the size of this part of the portion able to be welded to the wall.

The liquid tank according to the invention is made of plastic, that is to say of a material comprising at least one synthetic resin polymer. All types of plastic may be suitable. Particularly suitable plastics come from the thermoplastic category. The term "thermoplastic" denotes any thermoplastic polymer including thermoplastic elastomers, as well as blends thereof. The term "polymer" denotes both homopolymers and copolymers (especially binary or ternary copolymers). Examples of such copolymers are, non-limitingly, random copolymers, linear block copolymers, other block copolymers and graft copolymers. One polymer which is often used is polyethylene. Excellent results have been obtained with high density polyethylene (HDPE). The tank can be monolayer or multilayer structures. In case of multilayer structure, an impermeable layer can be EVOH (a copolymer of ethylene and partially hydrolysed vinyl acetate).

The invention will be better understood through the following figures which illustrate certain concrete aspects of the invention. The figures are only shown as examples and do not limit the scope of the present invention.

Figure 1:
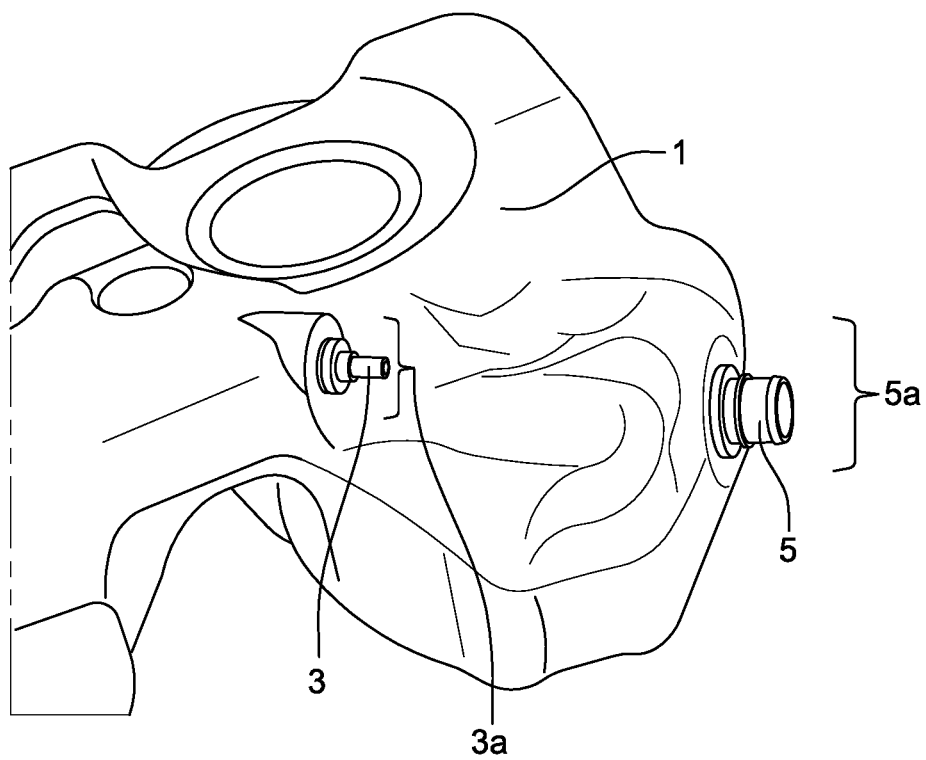
FIG. 1 is a global view of a tank with two components welded thereon.

FIG. 1 shows a tank 1 comprising two components 3, 5 welded thereon. The first component of the tank 1 is a nipple 3 located in the upper part of the tank 1 and an inlet check valve 5 located in the lower part of the tank 1.

The shape of the tank 1 has no importance in the context of this invention. The only relevant geometrical feature of the tank is its shape in the part 3a, 5a around each component 3, 5.

Nipple 3 and inlet check valve 5 are components which connect to the tank 1 in order to allow a fluid communication between the inside and the outside of the tank, by means external pipes (not shown). The invention is not limited to such components allowing a fluid circulation between the inside and the outside of the tank. In other words, the components 3, 5 may be closed at one end to carry out a specific function which would not be a circulation of liquid.

In the following figures, sectional views are represented of component 5. However, it could be any one of the two components 3, 5 of FIG. 1, which are given only as examples of possible components weldable to a tank recording to the invention.

Figure 2:
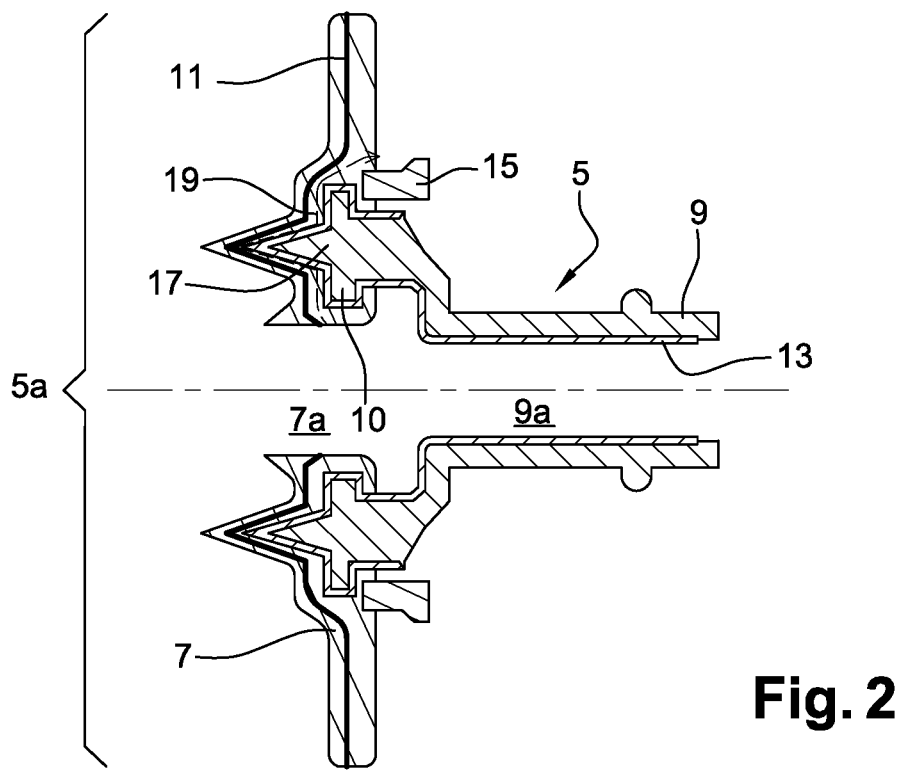
FIG. 2 is a longitudinal sectional view of one of the components and the part of the tank receiving the component, according to a first embodiment of the invention.

In the sectional view of FIG. 2, part 5a of the tank wall 7 is represented with a hole 7a. The component wall 9 is represented with an opening 9a in front of the hole 7a. The component has a cylindrical shape in this example but any shape of the component would be acceptable. It comprises a portion 10 which is embedded in the tank wall.

The tank wall 7 and the component wall 9 each comprise an impermeable layer 11, respectively 13, which prevents the liquid present inside the tank 1 from passing through the tank wall 7 or through the component wall 9. In this example, the tank impermeable layer 11 is included inside the tank wall 7 and is roughly located in the middle of the thickness of the tank wall 7. The component impermeable layer 13 covers the internal face of the component wall 9 and wraps its portion embedded in the tank wall. In this example, the tank is a fuel tank and the impermeable layers 11 and 13 are fuel impermeable layers made of EVOH.

Since the component impermeable layer 13 is chemically incompatible with the plastic material of the tank wall, the embedded portion 10 has an external surface which is covered by chemically incompatible with the plastic material of the tank wall.

Thus, after having penetrated in the tank wall 7, the portion 10 of the component embedded in the tank wall does not merge with the material of the tank wall but is only clamped in the tank wall. The clamping part of the tank wall around the embedded portion 10 of the component may open and release the component 5.

To prevent such a release, a strengthening ring 15 is welded to the tank wall, over the embedded portion 10 of the component. The strengthening ring 15 is made of a material which is chemically compatible with the material of the tank wall 7. Preferably, it is harder than the material of the tank wall.

In other words, the strengthening ring 15 is welded to the tank wall 7 to withstand the stress of the plastic material of the tank wall in a region surrounding the embedded portion 10 of the component 5.

On the internal side of the embedded portion 10 of the component, facing the inside of the tank, a sharp shape 17 of the component increases the leak-tighness of the welding, by lengthening the escape way 19 (represented by a dashed line) for the liquid coming from inside the tank.

Figure 3:
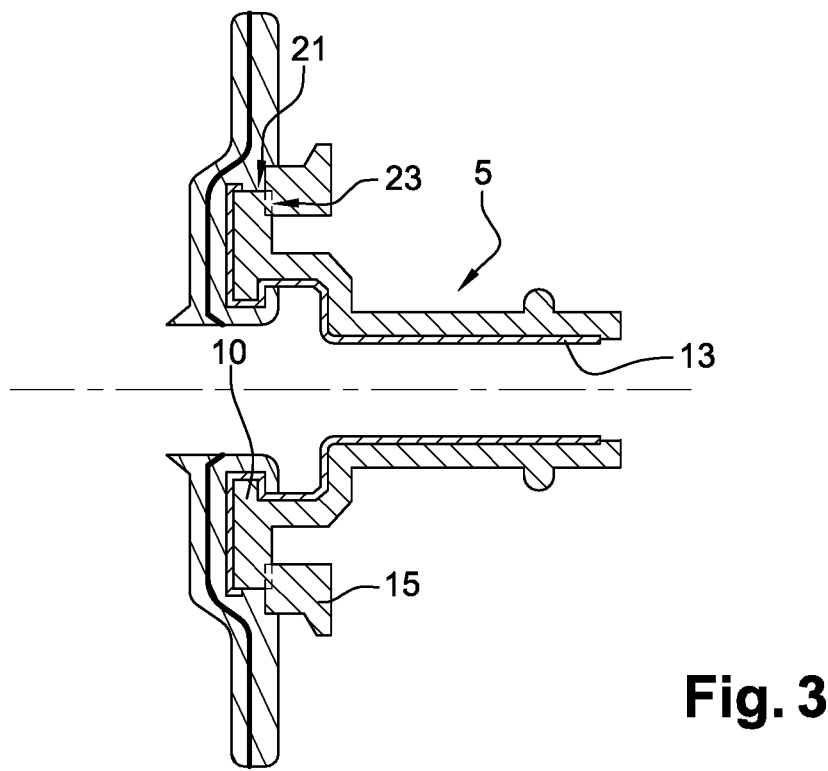
FIG. 3 is a longitudinal sectional view of one of the components and the part of the tank receiving the component, according to a second embodiment of the invention.

In the embodiment of FIG. 3, the component 5 has an embedded portion 10 which is not entirely covered by the component impermeable layer. It leaves a surface 21 of the component, on the embedded portion 10, free for welding with the tank wall 7.

At the same time, it leaves an outside (i.e. not embedded in the tank wall) surface 23 of the component free for welding with the strengthening ring 15 when the latter is subsequently welded to the tank wall. This further reinforces the mechanical resistance of the welding.

Figure 4:
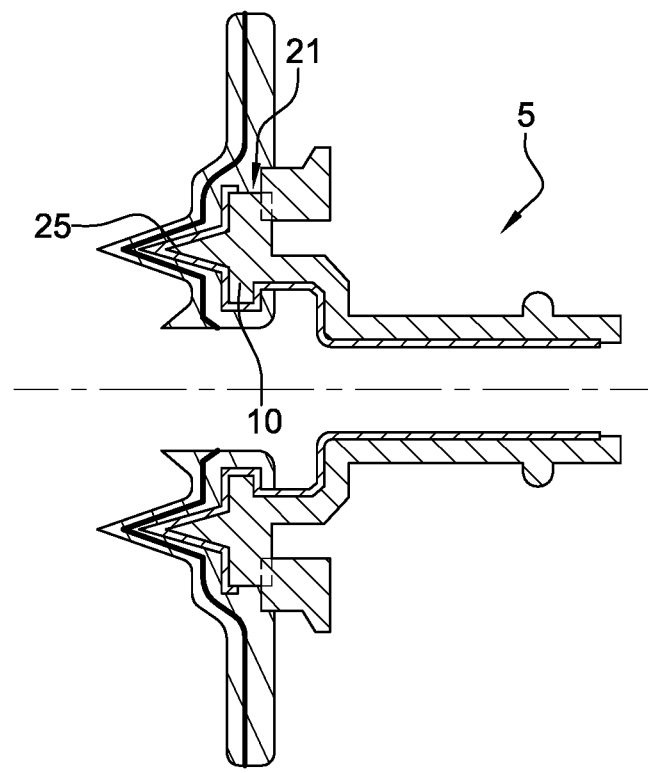
FIG. 4 is a longitudinal sectional view of one of the components and the part of the tank receiving the component, according to a third embodiment of the invention.

FIG. 4 shows a combination of the embodiments of FIGS. 2 and 3: the embedded portion 10 of the component has a sharp internal face 25 for the improvement of the leak-tighness of the welding, and the strengthening ring is welding to the component for the improvement of the mechanical resistance of the welding.

Figure 5:
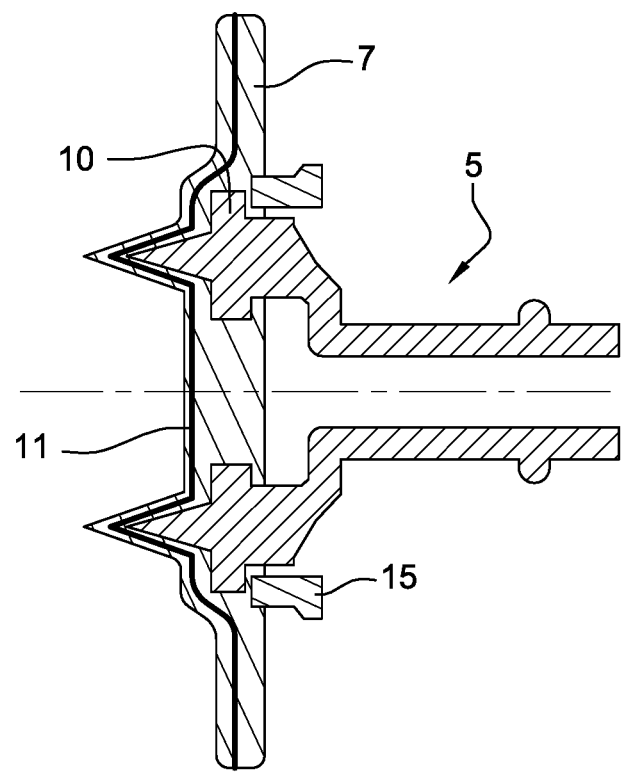
FIG. 5 is a longitudinal sectional view of one of the components and the part of the tank receiving the component, according to a fourth embodiment of the invention.

FIG. 5 shows another embodiment in which the component is integrally made of an impermeable material. In this case, the component is merely clamped inside the tank wall, as the component of FIG. 2, and the solidity of the welding results from the welding of the strengthening ring, over the embedded portion 10 of the component.

The invention is not limited to the above embodiments and other embodiments exists and will appear clearly to one skilled in the art. For example, the filler pipe and the fuel tank can both be multilayer structures.

The invention can also be applied to a fluid tank. More precisely, the invention can be applied to a gas tank, for example a tank for the storage of hydrogen or ammonia gas.

In an alternative embodiment, the invention relates to a gas tank having a wall made of a plastic material, the gas tank comprising a component having a portion embedded in the gas tank wall. The gas tank is such that it comprises at least one strengthening element welded to the gas tank wall to withstand the stress of the plastic material of the gas tank wall in a region surrounding the embedded portion of the component. The gas tank wall can be made of a monolayer or multilayer structure. In case of multilayer structure, it can comprise a gas impermeable layer.

The invention claimed is:

1. A liquid vehicle tank having a wall made of a plastic material, the tank comprising a component having a portion embedded in the tank wall, the component and the portion embedded in the tank being integrally formed,
    wherein the tank comprises at least one strengthening element welded to the tank wall, over the portion of the component embedded in the wall, to withstand the stress of the plastic material of the tank wall in a region surrounding the embedded portion of the component,
    wherein said portion embedded in the tank wall is achieved by burying said portion in a bloc of solid material forming the wall of the tank to trap the part within the tank wall such that said portion cannot be withdrawn from the bloc without opening the bloc which encapsulates said portion, and
    wherein the component and the strengthening element are two separate pieces the strengthening element being welded to the tank separately from the component and the embedded portion of the component.

2. The tank according to claim 1, wherein the strengthening element has a ring shape.

3. The tank according to claim 1, wherein the embedded portion has an external surface a part of which is chemically incompatible with the plastic material of the wall, and the strengthening element is welded to the wall over the embedded portion of the component.

4. The tank according to claim 1, wherein the wall has an opening and the component is affixed to the wall around the opening.

5. The tank according to claim 1, wherein an external surface of the embedded portion has a second part which is chemically compatible with the plastic material of the wall and which is welded to the wall of the tank.

6. The tank according to claim 1, wherein the part of an external surface of the component which is chemically incompatible with the plastic material of the wall is made of a liquid impermeable layer.

7. The tank according to claim 1, wherein the wall of the tank comprises a liquid impermeable barrier.

8. The tank according to claim 7, wherein the embedded portion of the component comprises an internal surface which follows the shape of the liquid impermeable barrier of the wall.

9. The tank according to claim 8, wherein the maximal distance between the internal surface of the embedded portion of the component and the fuel impermeable barrier of the wall is less than 200 μm.

10. The tank according to claim 8, wherein the internal surface of the embedded portion of the component comprises a projection.

11. Method for fastening a component to a wall of a tank, comprising the following steps:
    overmolding a portion of the component on a parison during blow molding of the parison so that the portion is at least partially embedded in the parison such that said portion is buried in a bloc of solid material forming the wall of the tank which traps the part within the tank wall such that said portion cannot be withdrawn from the bloc without opening the bloc which encapsulates said portion, the component and the embedded portion being integrally formed,
    welding a strengthening element to the wall over the portion of the component embedded in the wall to withstand the stress of the plastic material of the tank wall in a region surrounding the embedded portion of the component, and wherein the component and the strengthening element are two separate pieces the strengthening element being welded to the tank separately from the component and the embedded portion of the component.

12. The method according to claim 11, wherein an opening is drilled in the rigid wall through the portion of the component embedded in the parison.

13. The method according to claim 11, wherein an opening is obtained by piercing the parison during blow molding of the parison at the time the portion of the component is overmolded around the opening.

14. A liquid vehicle tank having a wall made of a plastic material, the tank comprising a component having a portion embedded in the tank wall,
    wherein the tank comprises at least one strengthening element welded to the tank wall, over the portion of the component embedded in the wall, to withstand the stress of the plastic material of the tank wall in a region surrounding the embedded portion of the component, wherein said portion embedded in the tank wall is achieved by burying said portion in a bloc of solid material forming the wall of the tank to trap the part within the tank wall such that said portion cannot be withdrawn from the bloc without opening the bloc which encapsulates said portion, and wherein the component and the strengthening element are two separate pieces and the strengthening element is attached to a radially outer end of the embedded portion of the component.

\* \* \* \* \*